(12) United States Patent
Nakajima

(10) Patent No.: US 6,529,660 B2
(45) Date of Patent: Mar. 4, 2003

(54) OPTICAL MULTIPLEXER/DEMULTIPLEXER AND ITS MANUFACTURE METHOD

(75) Inventor: Toshihiro Nakajima, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/925,185

(22) Filed: Aug. 9, 2001

(65) Prior Publication Data

US 2002/0044733 A1 Apr. 18, 2002

(30) Foreign Application Priority Data

Aug. 10, 2000 (JP) ........................................ 2000-242897

(51) Int. Cl.[7] .............................. G02B 6/34; H04J 14/02
(52) U.S. Cl. ............................ 385/37; 385/14; 385/39; 359/115; 359/124; 359/130
(58) Field of Search ............................ 385/14, 37, 39, 385/42, 129, 130; 359/115, 124, 130

(56) References Cited

U.S. PATENT DOCUMENTS

| | | | |
|---|---|---|---|
| 6,137,939 A | 10/2000 | Henry et al. | 385/132 |
| 6,212,323 B1 * | 4/2001 | Harpin et al. | 385/129 |
| 6,421,572 B1 * | 7/2002 | Moroni et al. | 385/14 |
| 6,442,311 B1 * | 8/2002 | Barbarossa et al. | 385/37 |
| 2001/0012426 A1 * | 8/2001 | Kato | 385/37 |

FOREIGN PATENT DOCUMENTS

JP   11-160559   6/1999   ............ G02B/6/12

* cited by examiner

*Primary Examiner*—Brian Healy
*Assistant Examiner*—Kevin S Wood
(74) *Attorney, Agent, or Firm*—Dickstein, Shapiro, Morin & Oshinsky LLP

(57) ABSTRACT

An optical multiplexer/demultiplexer has: a substrate having a principal surface on which the optical multiplexer/demultiplexer is formed; a first waveguide unit having a plurality of first waveguides; a first slab waveguide connected to the first waveguide unit; an arrayed waveguide grating having one end connected to the first slab waveguide, the arrayed waveguide grating including a plurality of arrayed waveguides each having a core section, the core section being a serial connection of a plurality of core regions having a different refraction index, and ratios of lengths of the plurality of core regions having a different refraction index being adjusted so that an optical path length of each of the plurality of arrayed waveguides becomes approximately equal; a second slab waveguide connected to another end of the arrayed waveguide grating; and a second waveguide unit connected to the second slab waveguide and having a plurality of second waveguides. An arrayed waveguide grating type optical multiplexer/demultiplexer can be made compact.

18 Claims, 14 Drawing Sheets

OPTICAL MULTIPLEXER/DEMULTIPLEXER AND ITS MANUFACTURE METHOD

This application is based on Japanese Patent Application 2000-242897, filed on Aug. 10, 2000, the entire contents of which are incorporated herein by reference.

BACKGROUND OF THE INVENTION a) Field of the Invention

The present invention relates to an optical multiplexer/demultiplexer having an arrayed waveguide grating (AWG) and to its manufacture method. More particularly, the present invention relates to an arrayed waveguide grating and its manufacture method in which each core section of some or all arrayed waveguides is made of a combination of a plurality of core regions having a different refraction index.

b) Description of the Related Art

An AWG type optical multiplexer/demultiplexer used in an optical fiber, such as shown in FIG. 18, is known.

The optical multiplexer/demultiplexer shown in FIG. 18 has sixteen channels and is constituted of input waveguides 2(1) to 2(16), a first slab waveguide 3, an arrayed waveguide grating 4, a second slab waveguide 5, and output waveguides 6(1) to 6(16), respectively connected serially and formed on the surface of a substrate 1. The arrayed waveguide grating 4 is constituted of sixteen four arrayed waveguides 6(1) to 6(64) each curved in generally a C-character shape. The arrayed waveguides 6(1) to 6(64) become gradually longer in this order. An optical path length difference between adjacent arrayed waveguides is set to an integer multiplication of a design wavelength (e.g., 1.55 $\mu$m).

The slab waveguide 3 receives incidence light from the input waveguides 2(1) to 2(16) at its incidence plane A, and uniformly distributes the light intensity of each incidence light at the incidence plane B of the arrayed waveguides 4(1) to 4(64). A plurality of waveguide is disposed in an arrayed form. The slab waveguide 5 receives incidence light from the arrayed waveguides 4(1) to 4(64) at its incidence plane C, and converges the incidence light on the incidence plane D of the output waveguides 6(1) to 6(16). The convergence points at the incidence plane D are different for respective wavelengths, and the output waveguides 6(1) to 6(16) are disposed in correspondence with the sixteen convergence points.

The signal input/output characteristics of the optical multiplexer/demultiplexer shown in FIG. 18 are as follows. As wavelength multiplexed light having wavelengths $\lambda_1$, $\lambda_2$, ..., $\lambda_{16}$ is input to the input waveguide 2(1), light beams having the wavelengths $\lambda_1$, $\lambda_2$, ..., $\lambda_{16}$ are output from the output waveguides 6(1), 6(2), ..., 6(16). As similar wavelength multiplexed light is input to the input waveguide 2(2), light beams having the wavelengths $\lambda_2$, $\lambda_3$, ..., $\lambda_1$ are output from the output Waveguides 6(1), 6(2), ..., 6(16). As similar wavelength multiplexed light is input to the input waveguide 2(16), light beams having the wavelengths $\lambda_{16}$, $\lambda_1$, ..., $\lambda_{15}$ are output from the output waveguides 6(1), 6(2), ..., 6(16). A demultiplexing function and a wavelength routing function are therefore obtained. If the output waveguides 6(1) to 6(16) and the input waveguides 2(1) to 2(16) are interchanged, a multiplexing function is obtained.

With this conventional technology, it is necessary to make the arrayed waveguides 4(1) to 4(64) have different optical path lengths so that each waveguide has the C-character shape and the size reduction of the substrate 1 is difficult. A silicon wafer or the like is scribed into rectangular substrates. If the size of the substrate 1 is large, the number of substrates (optical multiplexers/demultiplexers) capable of being formed from one wafer decreases, which results in an increased cost.

SUMMARY OF THE INVENTION

It is an object of the present invention to provide a novel compact AWG type optical multiplexer/demultiplexer and its manufacture method.

According to one aspect of the present invention, there is provided an optical multiplexer/demultiplexer, comprising: a substrate having a principal surface on which the optical multiplexer/demultiplexer is formed; a first waveguide unit having a plurality of first waveguides; a first slab waveguide connected to the first waveguide unit; an arrayed waveguide grating having one end connected to the first slab waveguide, the arrayed waveguide grating including a plurality of arrayed waveguides each having a core section, the core section being a serial connection of a plurality of core regions having a different refraction index, and ratios of lengths of the plurality of core regions having a different refraction index being adjusted so that an optical path length of each of the plurality of arrayed waveguides becomes approximately equal; a second slab waveguide connected to another end of the arrayed waveguide grating; and a second waveguide unit connected to the second slab waveguide and having a plurality of second waveguides.

According to the optical multiplexer/demultiplexer, regardless of that each optical path length of the plurality of arrayed waveguides is made approximately equal, an equiphase plane can be formed on one side of the plurality of arrayed waveguides. Since each of the optical path length of the plurality of arrayed waveguides is made approximately equal, the degree of design freedom for the pattern of the plurality of arrayed waveguides can be increased. Since each of the optical path length of the plurality of arrayed waveguides is made approximately equal, as compared to the case of different optical path lengths, the area occupied by the arrayed waveguide grating can be reduced.

According to another aspect of the present invention, there is provided an optical multiplexer/demultiplexer, comprising: a substrate having a principal surface on which the optical multiplexer/demultiplexer is formed; a first waveguide unit having a plurality of first waveguides; a first slab waveguide connected to the first waveguide unit; an arrayed waveguide grating having one end connected to the first slab waveguide, the arrayed waveguide grating including a plurality of arrayed waveguides each having a core section, the core section being a serial connection of a plurality of core regions having a different refraction index, and ratios of refraction indices of the plurality of core regions having a different refraction index being adjusted so that an optical path length of each of the plurality of arrayed waveguides becomes approximately equal; a second slab waveguide connected to another end of the arrayed waveguide grating; and a second waveguide unit connected to the second slab waveguide and having a plurality of second waveguides.

According to the optical multiplexer/demultiplexer, regardless of that each optical path length of the plurality of arrayed waveguides is made approximately equal, an equiphase plane can be formed on one side of the plurality of arrayed waveguides. Since each of the optical path length of the plurality of arrayed waveguides is made approximately equal, the degree of design freedom for the pattern of the plurality of arrayed waveguides can be increased. As compared to the case of different optical path lengths, the area occupied by the arrayed waveguide grating can be reduced. Since the optical path length of the arrayed waveguide can ba adjusted by the refraction index of the core region, the degree of design freedom for the pattern of the core region can be increased.

According to another aspect of the present invention, there is provided a method of manufacturing an optical multiplexer/demultiplexer having a first waveguide unit, a first slab waveguide, an arrayed waveguide grating, a second slab waveguide, and a second waveguide unit, respectively connected in series, the method comprising: (a) a step of preparing a substrate; (b) a step of depositing a first dad layer on a principal surface of the substrate; (c) a step of forming a first core material layer on the first clad layer, the first core material layer having a first refraction index; (d) a step of changing a partial region of the first core material layer to a second core material layer having a second refraction index different from the first refraction index; and (e) a step of forming an arrayed waveguide grating including a plurality of arrayed waveguides by forming a plurality of core regions including a serial connection of the first and second core material layers in predetermined areas including areas where the first and second core material layers are formed in contact with each other and depositing a second clad layer on the first clad layer, ratios of lengths of the first and second core material layers being adjusted so that an optical path length of each of the plurality of arrayed waveguides becomes approximately equal.

With this manufacture method, the core region is formed by the step of changing the partial region of the first core material layer having the first refraction index to the second core material layer having the second refraction index different from the first refraction index. Accordingly, the structure that each optical path length of the plurality of arrayed waveguides is made approximately equal and the equiphase plane is formed on one side of the arrayed waveguide grating, can be formed with simple steps.

The size of a substrate on which an arrayed waveguide grating is formed can be made small, which results in a compact optical multiplexer/demultiplexer and a low cost. Since a straight arrayed waveguide grating is formed, a light loss to be caused by a curved waveguide can be reduced.

Furthermore, since the refraction index of some core regions among a plurality of core regions is made different for each core section. Accordingly, the degree of design freedom can be improved and a straight arrayed waveguide grating can be formed easily.

Still further, after the second core material layer is formed filling one or more holes formed in the first core material layer, the first and second core material layers are patterned to form a plurality of core sections. In this case, the size and shape of each core section can be controlled easily and the manufacture yield can be improved.

DETAILED DESCRIPTION OF THE PREFERRED EMBODIMENTS

Figure 1A:
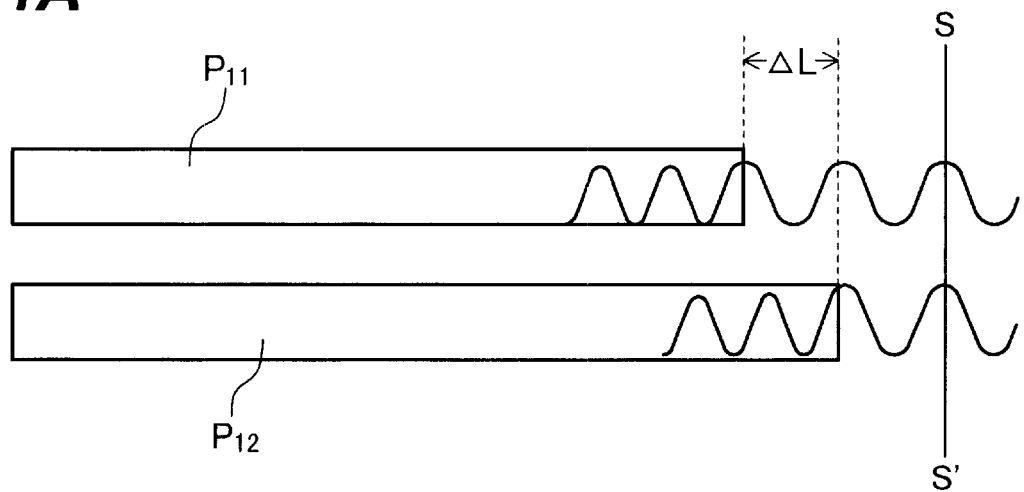
FIGS. 1A and 1B are diagrams illustrating a principle of this invention.

The principle of the invention will be described with reference to FIGS. 1A and 1B. FIG. 1A is a diagram illustrating the operation principle of conventional arrayed waveguides. First and second core sections are made of low diffraction index (n) core regions $P_{11}$ and $P_{12}$. There is a predetermined optical path length difference $\Delta L$ between the first and second core regions $P_{11}$ and $P_{12}$. The refraction index of the low refraction index core regions $P_{11}$ and $P_{12}$ is lower than that of a high refraction index core region Q shown in FIG. 1B, but higher than that of a clad region, which surrounds the low refraction index core regions $P_{11}$ and $P_{12}$. By providing the optical path length difference $\Delta L$ between the low refraction index core regions $P_{11}$ and $P_{12}$, an equiphase plane S–S' can be formed on the output side of the arrayed waveguides.

Figure 1B:
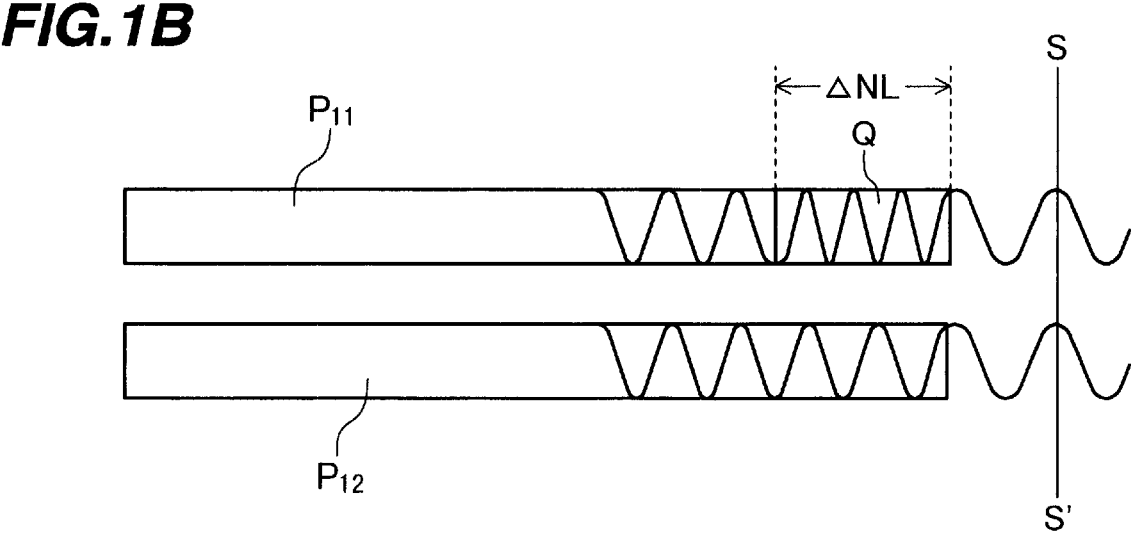

In the arrayed waveguides shown in FIG. 1B, the first core section is constituted of a combination of the low refraction index core region $P_{11}$ and high refraction index core regions Q, and the second core section is constituted of only the low refraction index core region $P_{12}$. In this case, by adjusting the refraction index of the high refraction index core region Q and a length $\Delta NL$, the equiphase plane S–S' can be formed on the output side of the arrayed waveguides and the optical path length difference can be reduced. In the example shown in FIG. 1B, the optical path length difference ΔL between the low refraction index regions $P_{11}$ and $P_{12}$ is reduced to zero, in other words, the lengths of the first and second core sections are made equal. By reducing the optical path length difference ΔL, the arrayed waveguides can be made straight.

Figure 2:
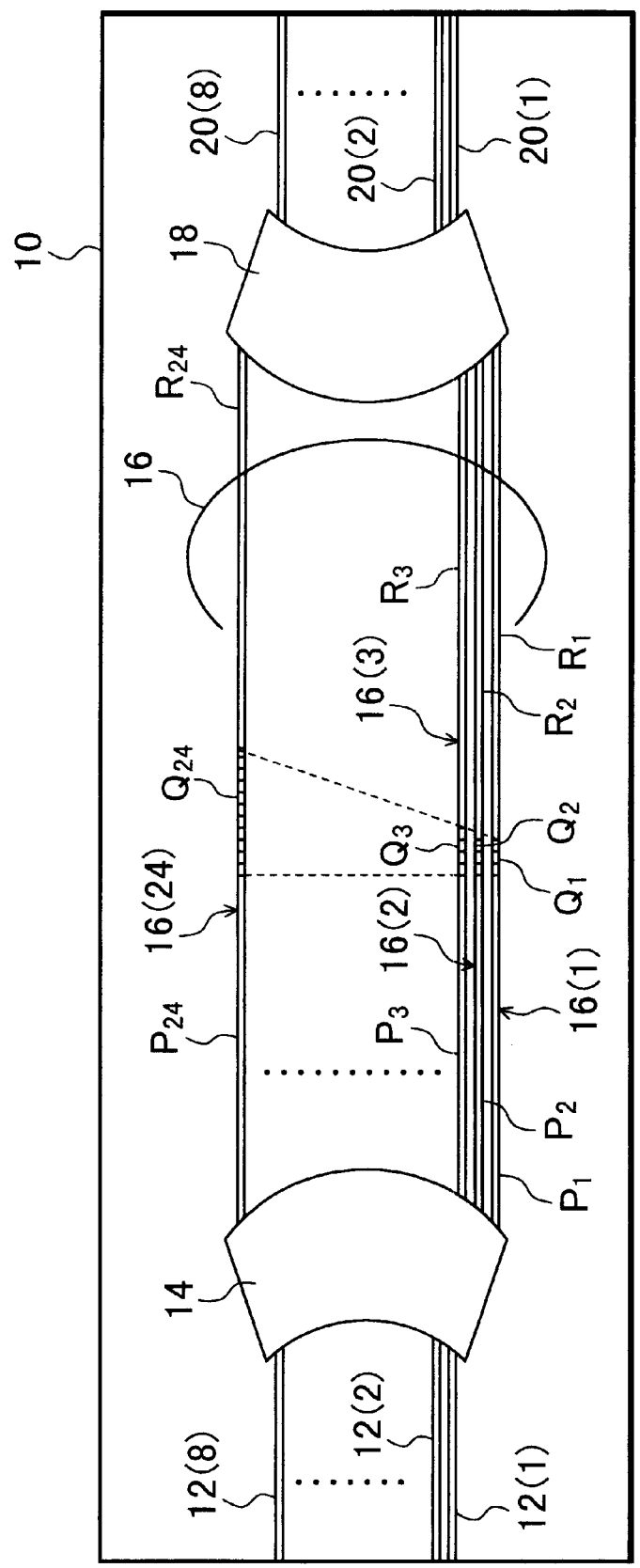
FIG. 2 is a top view of an optical multiplexer/demultiplexer according to an embodiment of the invention.
Figure 3:
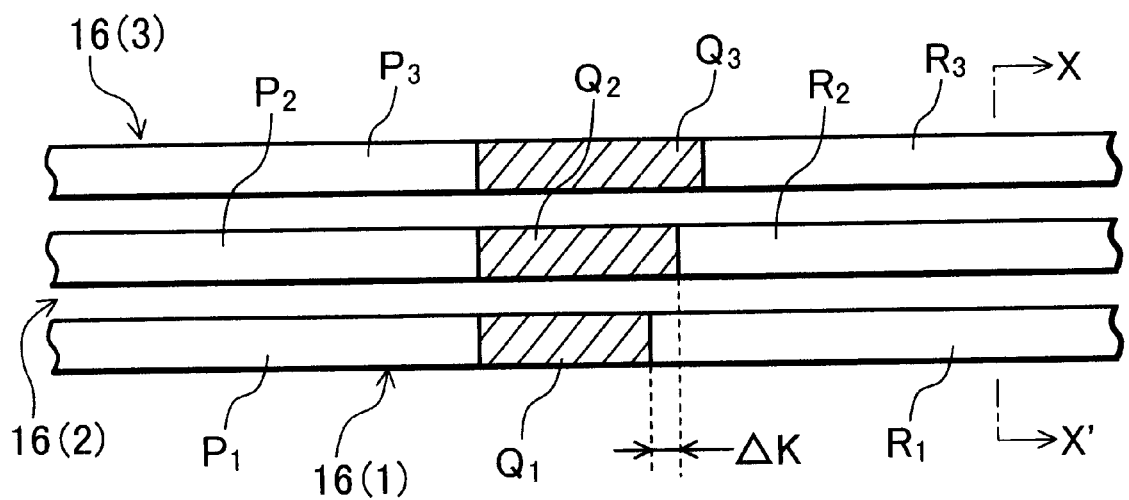
FIG. 3 is a top view of three arrayed waveguides of the optical multiplexer/demultiplexer shown in FIG. 2.
Figure 4:
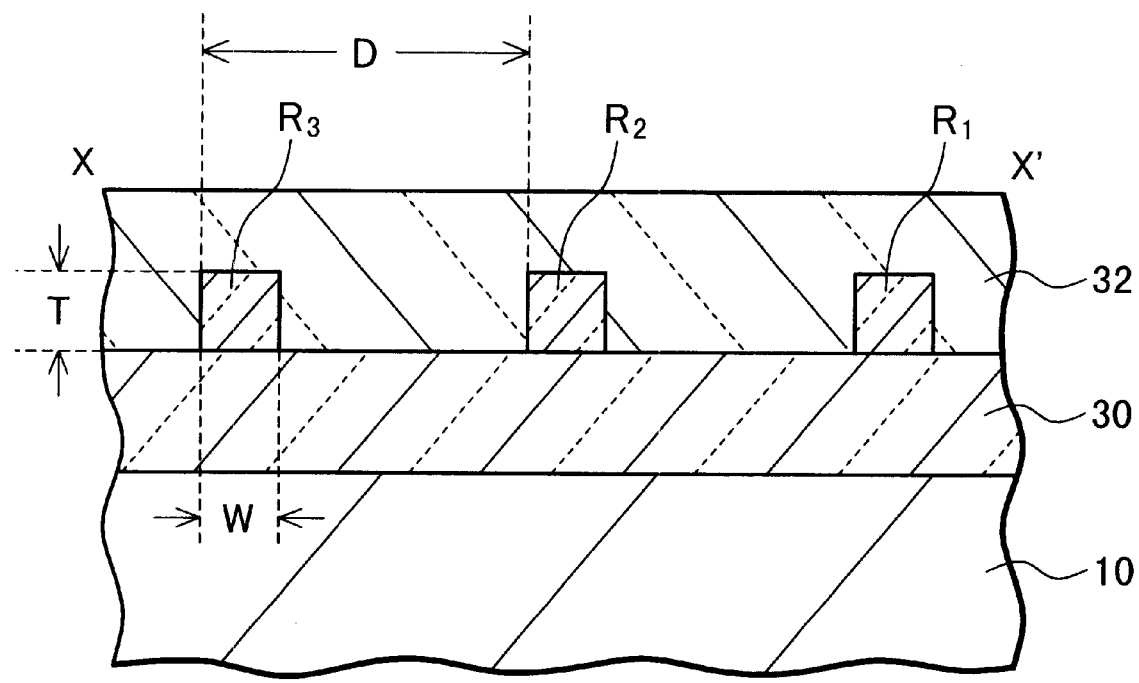
FIG. 4 is a cross sectional view taken along line X–X' of FIG. 3.

Next, an AWG type optical multiplexer/demultiplexer according to an embodiment of the invention will be described with reference to FIGS. 2 to 4. FIG. 2 is a diagram showing an AWG type optical multiplexer/demultiplexer having eight channels with twenty four arrayed waveguides. FIG. 3 is a diagram showing enlarged three arrayed waveguides among the twenty four waveguides shown in FIG. 2. FIG. 4 is a cross sectional view taken along line X–X' shown in FIG. 3.

The optical multiplexer/demultiplexer shown in FIG. 2 is constituted of input waveguides 12(1) to 12(8), a first slab waveguide 14, an arrayed waveguide grating 16, a second slab waveguide 18, and output waveguides 20(1) to 20(8), respectively connected serially and formed on the surface of a substrate 10. The arrayed waveguide grating 16 is constituted of straight arrayed waveguides 16(1) to 16(24). The arrayed waveguides 16(1) to 16(24) are constituted of low refraction index core regions $P_1$ to $P_{24}$, low refraction index core regions $R_1$ to $R_{24}$, and high refraction index core regions $Q_1$ to $Q_{24}$ interconnecting the low refraction index core regions $P_1$ to $P_{24}$ and low refraction index core regions $R_1$ to $R_{24}$.

More specifically, the core section of the arrayed waveguide 16(1) is made of a serial connection of $P_1$-$Q_1$-$R_1$, and the core section of the arrayed waveguide 16(2) is made of a serial connection of $P_2$-$Q_2$-$R_2$. Namely, the core section of each of the arrayed waveguides 16(1) to 16(24) is also made of a serial connection of $P_n$-$Q_n$-$R_n$ (n=1, 2, ..., 24). The structure of the core regions $P_1$ to $P_{24}$, $Q_1$ to $Q_{24}$, and $R_1$ to $R_{24}$ is shown in FIG. 4 by taking as an example the core regions $R_1$ to $R_3$. As shown in FIG. 4, a first clad layer 30 is formed on the surface of the substrate 10, and a second clad layer 32 is formed on the first clad layer 30. The core regions $P_1$ to $P_{24}$, $Q_1$ to $Q_{24}$, and $R_1$ to $R_{24}$ are formed on the first clad layer 30, and the second clad layer 32 covering the core regions is formed on the first dad layer 30.

An AWG type optical multiplexer/demultiplexer will be described which is formed under the conditions of, for example, a design wavelength of 1.55 μm, a channel space of 15 nm and eight channels. In order to reduce the optical path length difference ΔL of 12.8 μm between adjacent arrayed waveguides and making each arrayed waveguide straight, the refraction index of each of the low refraction index core regions $P_1$ to $P_{24}$ and $R_1$ to $R_{24}$ is set to 1.42. The refraction index of each of the high refraction index core regions $Q_1$ to $Q_{24}$ is set to 1.46. The refraction index of the clad layers 30 and 32 is set lower by 0.45% than that of the low refraction index core regions $P_1$ to $P_{24}$ and $R_1$ to $R_{24}$. Also, as shown in FIGS. 2 and 3, the high refraction index core regions $Q_1$ to $Q_{24}$ are set longer by ΔK=320 μm in the order from $Q_1$ to $Q_{24}$, where ΔK×Δn=ΔL and Δn=1.46–1.42. Also, as shown in FIG. 4, the width W and thickness T of each core region are set to 4 μm, and a pitch D between adjacent core regions is set to 60 μm.

Figure 18:
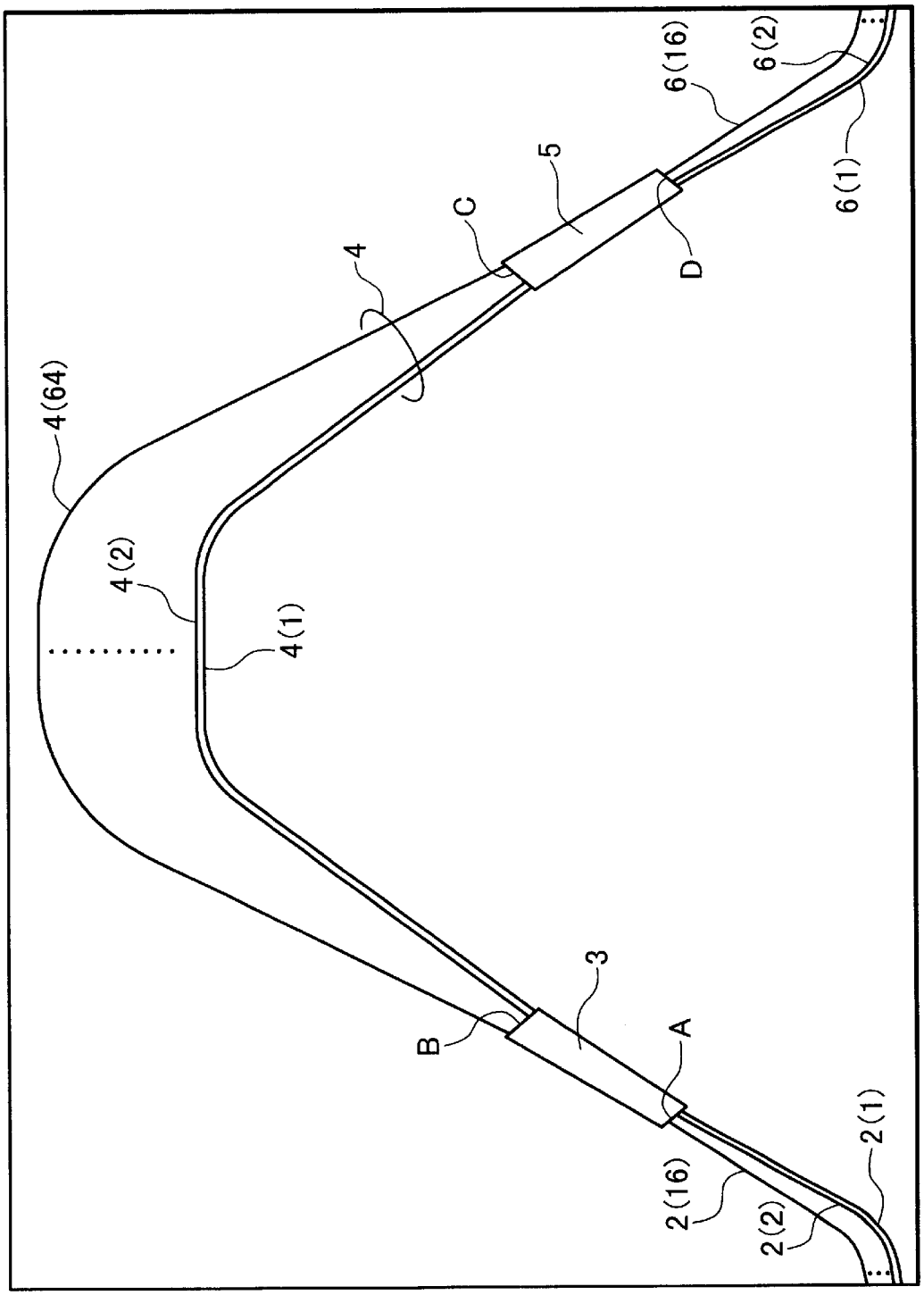
FIG. 18 is a top view of a conventional optical multiplexer/demultiplexer.

Similar to the AWG type optical multiplexer/demultiplexer shown in FIG. 18, the AWG type optical multiplexer/demultiplexer of this embodiment has the demultiplexing function, wavelength routing function and multiplexing function. Furthermore, by inserting the high refraction index core region $Q_n$ having a predetermined length in the low refraction index core region $P_n$, the optical path length difference of arrayed waveguides can be reduced or made zero even if each arrayed waveguide has the same length. It is therefore possible to form the arrayed waveguides 16(1) to 16(24) in a straight shape. The components from the input waveguides 12(1) to 12(8) to the output waveguides 20(1) to 20(8) can be disposed straight. The size of the substrate 10 can be reduced considerably. The number of chips (optical multiplexers/demultiplexers) capable of being formed from one wafer increases, which results in a reduced cost. In this embodiment, although the refraction index of the high refraction index core regions $Q_1$ to $Q_{24}$ of the AWG type optical multiplexer/demultiplexer is set to a constant value of 1.46, the refraction index of the high refraction index core regions $Q_1$ to $Q_{24}$ may be set differently. Also in this case, a multiplication value between $\Delta_n$ and $\Delta_k$ is set to the optical path length difference, where Δn is a refraction index difference among the low refraction index core regions $P_1$ to $P_{24}$ and $R_1$ to $R_{24}$. A combination of a core region having a refraction index lower than that of the low refraction index core region, the low refraction index core region, and the high refraction index core region $Q_n$, may be used to form a plurality of core sections having generally the same optical path length.

Next, with reference to FIGS. 5 to 15, manufacture processes for the AWG type optical multiplexer/demultiplexer shown in FIG. 2 will be described. A wafer 10A is, for example, a silicon wafer.

Figure 5:
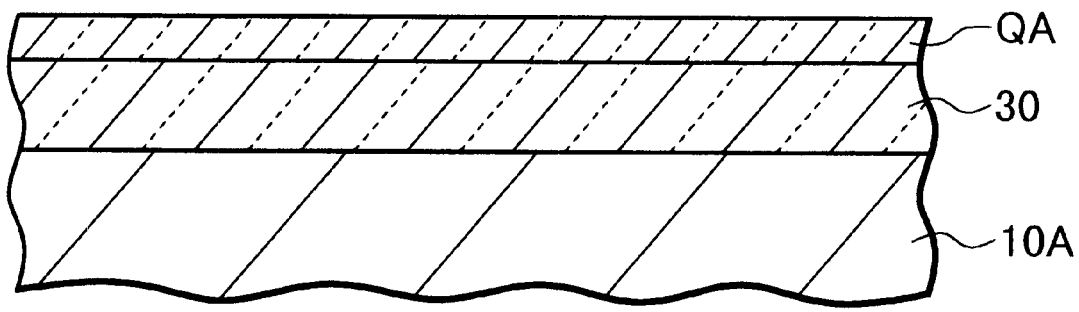
FIG. 5 is a cross sectional view illustrating a core material layer forming process in the method of manufacturing the optical multiplexer/demultiplexer shown in FIG. 2.

As shown in FIG. 5, on the surface of the wafer 10A, a clad layer 30 and a core material layer QA are formed sequentially in this order from the substrate 10A surface side, by plasma chemical vapor deposition (CVD). The clad layer 30 and core material layer QA are both made of silicon dioxide doped with impurities. The refraction index can be adjusted or designed from a doping amount of dopant for silicon dioxide, such as fluorine (F), boron (B), germanium (Ge), tin (Sn), and nitrogen (N). The low refraction index core material layer QA is used for forming the low refraction core regions $P_1$ to $P_{24}$ and $R_1$ to $R_{24}$.

Figure 6:
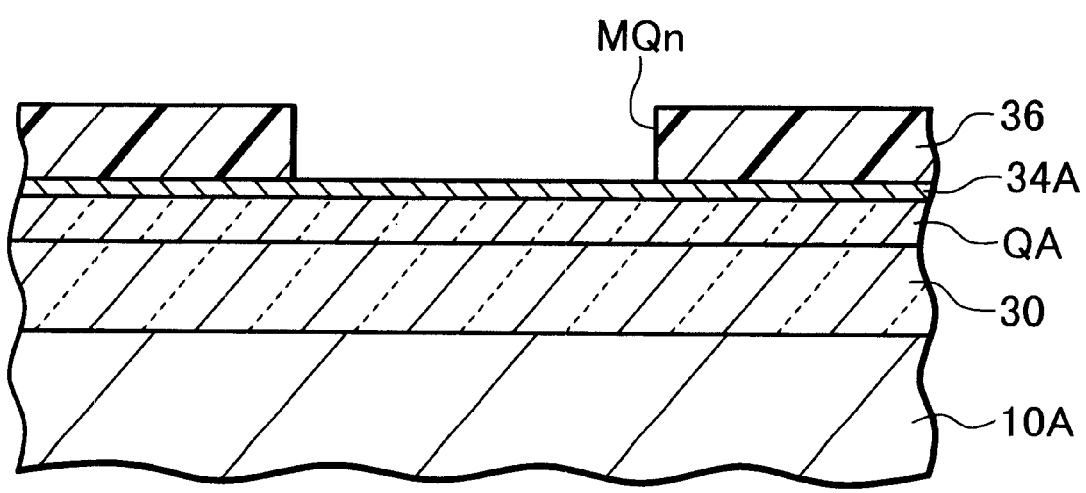
FIG. 6 is a cross sectional view illustrating a chromium layer forming process and a resist layer forming process, following the process shown in FIG. 5.

As shown in FIG. 6, a chromium layer 34A covering the core material layer QA is formed by sputtering. For example, the thickness of the chromium layer 34A is set to 300 nm.

Figure 13:
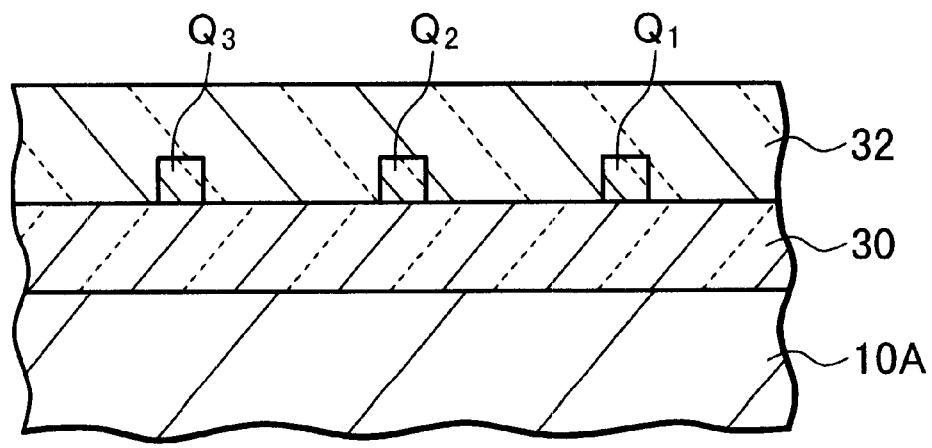
FIG. 13 is a cross sectional view illustrating a clad layer forming process, following the processes shown in FIG. 21.
Figure 14:
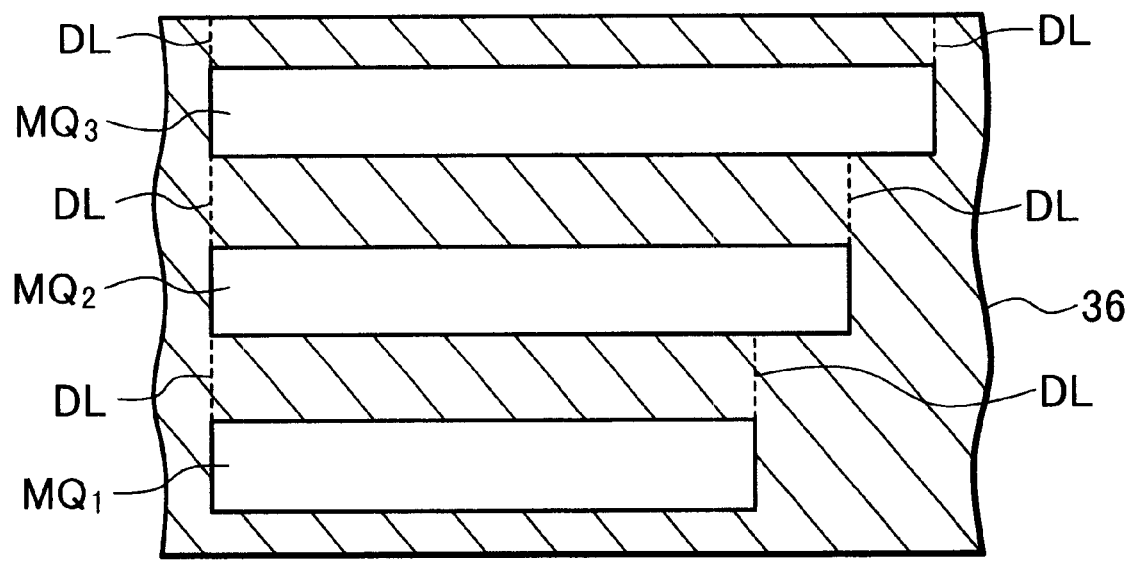
FIG. 14 is a plan view showing the layout of a resist layer 36.

Next, a resist mask 36 is formed on the chromium layer 34A by well known photolithography. The resist mask has holes $MQ_n$ (n=1, 2, 3, ..., 24) in areas corresponding to the high refraction core regions $Q_1$ to $Q_{24}$ (refer to FIG. 13) to be later formed as shown also in FIG. 14. The holes $MQ_n$ (holes $MQ_1$, $MQ_2$ and $MQ_3$ in FIG. 14) are formed in areas corresponding to the regions whose refraction indices are changed. The lengths of the holes (grooves) $MQ_1$, $MQ_2$ and $MQ_3$ satisfy the relation of $MQ_3$>$MQ_2$>$MQ_1$. As shown in FIG. 14, for example, one hole may be formed which covers a continuous area including the areas of $MQ_1$, $MQ_2$ and $MQ_3$ and areas inside of broken lines DL coupling the areas of $MQ_1$, $MQ_2$ and $MQ_3$. The resist mask 36 may be formed with a hole corresponding to an alignment mark.

Figure 7:
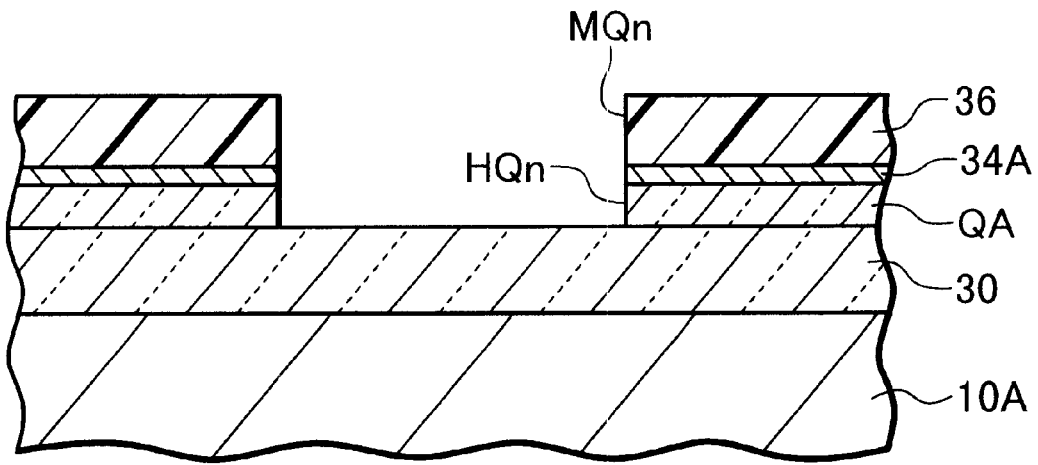
FIG. 7 is a cross sectional view illustrating a chromium layer etching process and a core material layer etching process, following the processes shown in FIG. 6.

As shown in FIG. 7, by using the resist mask 36, partial areas of the chromium layer 34A corresponding to the holes $MQ_n$ (n=1, 2, 3, ..., 24) are removed by ion milling. By using the resist mask 36 and a chromium layer 34A as a mask, holes $HQ_n$ (n=1, 2, 3, ..., 24) corresponding to the holes $MQ_n$ (n=1, 2, 3, ..., 24) are formed through the low refraction index core material layer QA by reactive ion etching (RIE) using $CHF_3$ as etching gas. Thereafter, the resist mask 36 is removed by ashing with $O_2$ plasma or the like. The hole corresponding to the alignment mark is also formed through the low refraction index core material layer QA. This hole can be used as the alignment mark which becomes a position alignment standard when resist layers 38 and 40 are later formed.

Figure 8:
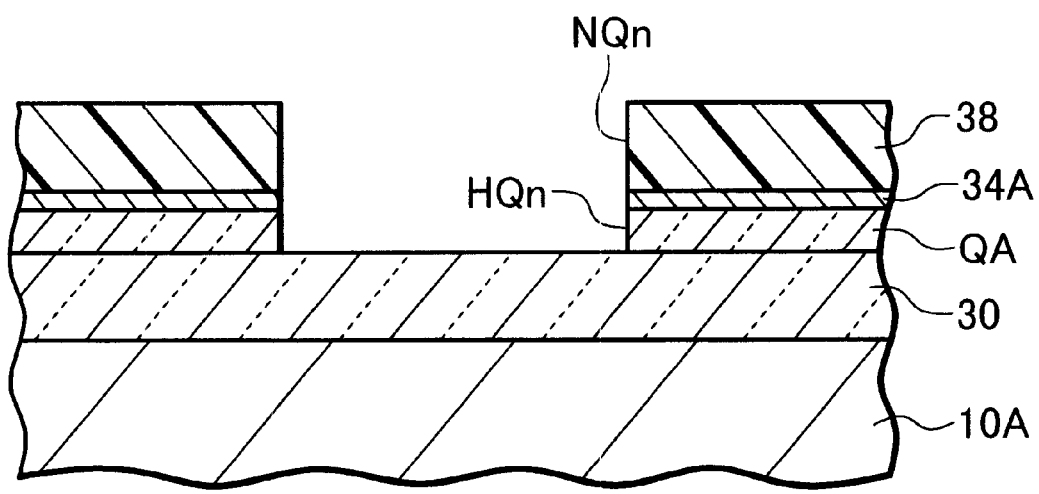
FIG. 8 is a cross sectional view illustrating a lift-off resist layer forming process, following the processes shown in FIG. 7.

As shown in FIG. 8, a lift-off resist layer is formed on the chromium layer 34A by photolithography. Holes $NQ_n$ (n=1, 2, 3, . . . , 24) corresponding to areas of the holes $HQ_n$ (n=1, 2, 3, . . . , 24) are formed through the resist layer to form a resist mask 38.

Figure 9:
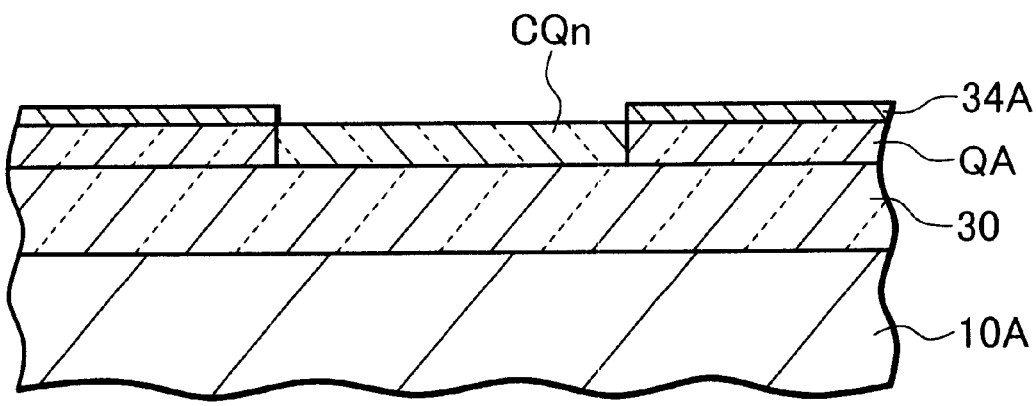
FIG. 9 is a cross sectional view illustrating a core material layer depositing process and a resist layer lift-off process, following the process shown in FIG. 8.
Figure 15:
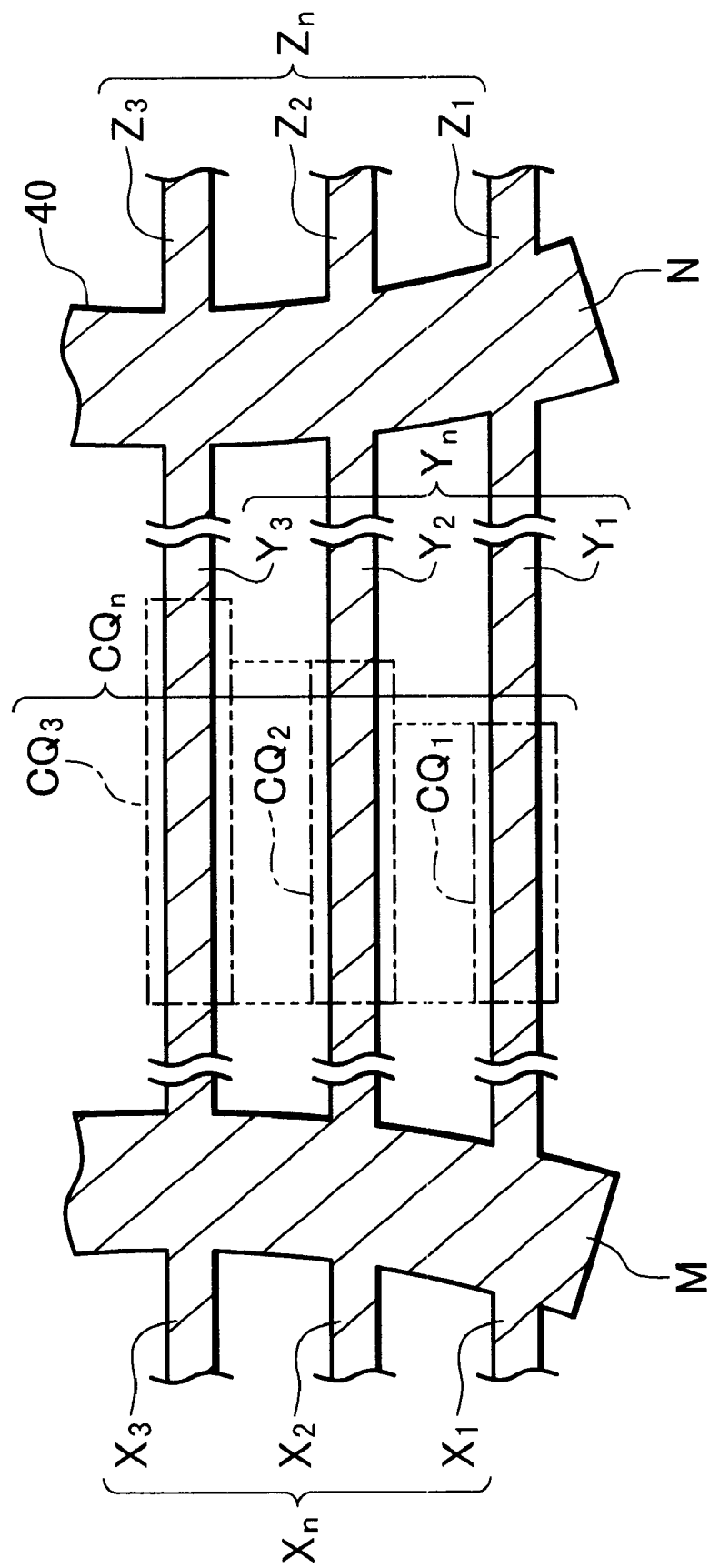
FIG. 15 is a plan view showing the layout of a resist layer 40.

As shown in FIG. 9, a high refraction index core material layer is formed over the wafer 10A by plasma CVD. The core material layer is used for forming the high refraction index core regions $Q_n$ (n=1, 2, 3, . . . , 24). The core material layer is made of silicon dioxide having a predetermined refraction index corresponding to the doping amount of dopant such as fluorine and boron. Thereafter, the resist mask 38 is removed by lift-off to remove the core material in the area other than the holes $HQ_n$ (n=1, 2, 3, . . . , 24). The core material $CQ_n$ (n=1, 2, 3, . . . , 24) is left in the holes $HQ_n$ (n=1, 2, 3, . . . , 24). In FIG. 15, only high refraction core material layers $CQ_1$, $CQ_2$ and $CQ_3$ are shown.

Figure 10:
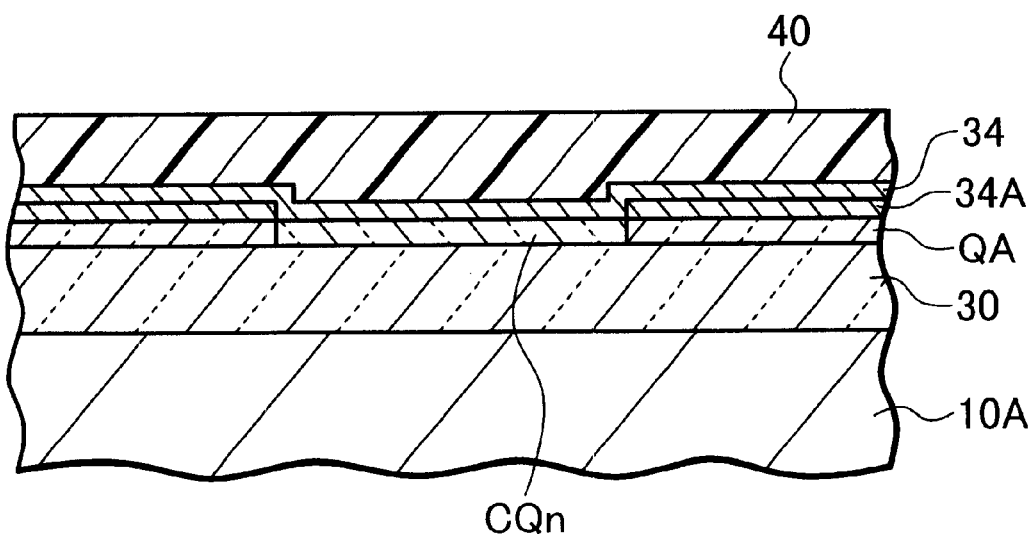
FIG. 10 is a cross sectional view illustrating a chromium layer forming process and a resist layer forming process, following the processes shown in FIG. 9.
Figure 11:
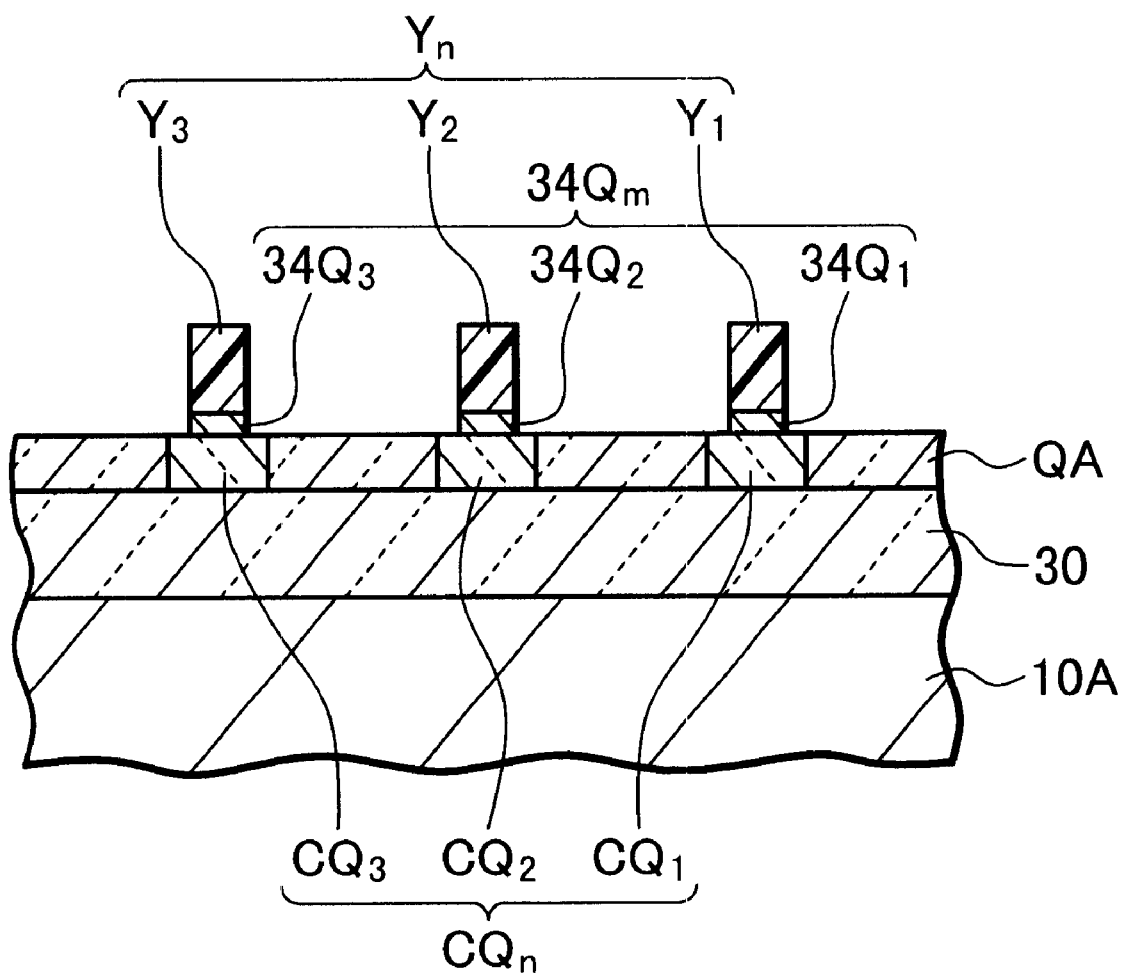
FIG. 11 is a cross sectional view illustrating a chromium layer etching process, following the processes shown in FIG. 10.

As shown in FIG. 10, a chromium layer 34 is formed over the wafer 10A by sputtering, the chromium layer 34 covering the high refraction index core material layer $CQ_n$ and chromium layer 34A. Thereafter, a resist mask 40 is formed on the chromium layer 34 by photolithography. The resist mask 40 has the pattern that the resist mask is left in the area indicated by right downward oblique lines in FIG. 15 (plan view). In FIG. 15, $X_1$ to $X_3$ represent a resist mask left in the area corresponding to the input waveguides 12(1) to 12(3). $Y_1$ to $Y_3$ represent a resist mask left in the area corresponding to the arrayed waveguides 16(1) to 16(3). $Z_1$ to $Z_3$ represent a resist mask left in the area corresponding to the output waveguides 20(1) to 20(3). M and N represent a resist mask left in the area corresponding to the first and second slab waveguides. Of the resist mask 40, $Y_1$ to $Y_3$ are formed superposed upon the high refraction index core material layers $CQ_1$ to $CQ_3$, as shown in FIGS. 11 and 15. In FIG. 15, although only three input waveguides $X_1$, $X_2$ and $X_3$, three arrayed waveguides $Y_1$, $Y_2$ and $Y_3$ and three output waveguides $Z_1$, $Z_2$ and $Z_3$ among those Xfl (n=1, 2, 3, . . . , 24), $Y_n$ (n=1, 2, 3, . . . , 24) and $Z_n$ (n=1, 2, 3, . . . , 24) are shown for the purposes of simplicity, in actual there are twenty four input waveguides, twenty four arrayed waveguides and twenty four output waveguides from n=1 to n=24.

As shown in FIG. 11, by using the resist mask 40, ion milling is performed. With this ion milling, the chromium layer 34 not covered with the resist mask 40 is selectively removed to leave the chromium layer 34 covered with the resist mask (FIG. 15). Chromium layers $34Q_1$, $34Q_2$, $34Q_3$, . . . are left on the high refraction index core material layers $CQ_1$, $CQ_2$, $CQ_3$, . . . in the areas corresponding to the resist mask regions $Y_1$, $Y_2$, $Y_3$. . . .

Figure 12:
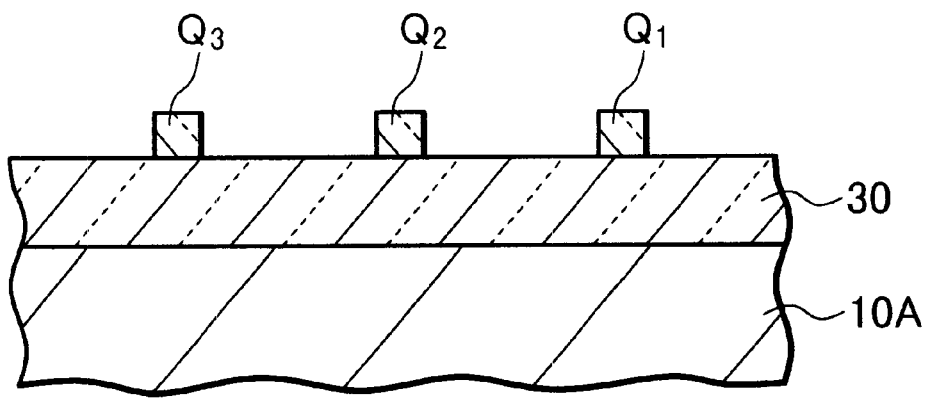
FIG. 12 is a cross sectional view illustrating a core material layer etching process and a process of removing the resist layer and chromium layer, following the process shown in FIG. 11.

By using the resist mask 40 and the left chromium layer 34 as a mask, the low refraction index core material layers QA and high refraction index core material layers $CQ_n$ ($CQ_1$, $CQ_2$, $CQ_3$, . . . ) are selectively removed by reactive ion etching (RIE) using $CHF_3$ as etching gas. The low refraction index core material layers QA and high refraction index core material layers $CQ_n$ ($CQ_1$, $CQ_2$, $CQ_3$, . . . ) corresponding to the resist pattern shown in FIG. 15 are therefore left. Of the high refraction index core material layers $CQ_n$ ($CQ_1$, $CQ_2$, $CQ_3$, . . . ), the high refraction index core regions $Q_n$ ($Q_1$, $Q_2$, $Q_3$, . . . ) are therefore left as shown in FIG. 12. The high refraction index core regions $Q_n$ (n=1, 2, 3, . . . , 24) are also made longer in the order from n=1 to n=24.

A clad layer 32 is formed on the clad layer 30 by plasma CVD, the clad layer 32 covering the left core material layers QA, $CQ_1$, $CQ_2$, $CQ_3$, . . . FIG. 13 is a cross sectional view showing that the high refraction index core regions $Q_1$, $Q_2$, $Q_3$, . . . are formed on the clad layer 30 and the clad layer 32 is formed on the clad layer 30, covering the high refraction index core regions $Q_1$, $Q_2$, $Q_3$, . . . Similar to the clad layer 30, the clad layer 32 is made of silicon dioxide doped with impurities. Thereafter, the wafer 10A is scribed to obtain chips corresponding to the substrate 10 shown in FIG. 10. With the structure described above, also the high refraction index core regions $Q_n$ (n=1, 2, 3, . . . , 24) have different lengths. Namely, as n becomes large, the length of the core region becomes longer.

With the above-described manufacture processes, the arrayed waveguides 16(1) to 16(24) are formed between the first and second slab waveguides M and N. Each core region constituting the arrayed waveguide has a high refraction core region ($Q_n$ (n=1, 2, 3, . . . , 24) having a different length for each arrayed waveguide 16(1) to 16(24) and low refraction index core regions QA formed on the first slab waveguide M side and second slab waveguide N side of each high refraction index core region $Q_n$.

In the above-described manufacture processes, instead of plasma CVD, other vapor depositions may be used for forming silicon dioxide doped with impurities. Instead of ion milling or reactive ion etching, other dry etching methods may be used for etching a silicon dioxide or titanium layer.

With the above-described manufacture processes, after the core material layers $CQ_1$, $CQ_2$, $CQ_3$, . . . are formed filling one or more holes or grooves formed between low refraction index core material layers QA, the core material layers QA, $CQ_1$, $CQ_2$, $CQ_3$, . . . are patterned to form a plurality of high refraction index core regions $Q_1$, $Q_2$, $Q_3$, . . . It is therefore easy to control the size and shape of each high refraction index core region ($Q_1$, $Q_2$, $Q_3$, . . . and a high manufacture yield can be obtained.

Next, an AWG type optical multiplexer/demultiplexer according to a second embodiment of the invention will be described.

Figure 16:
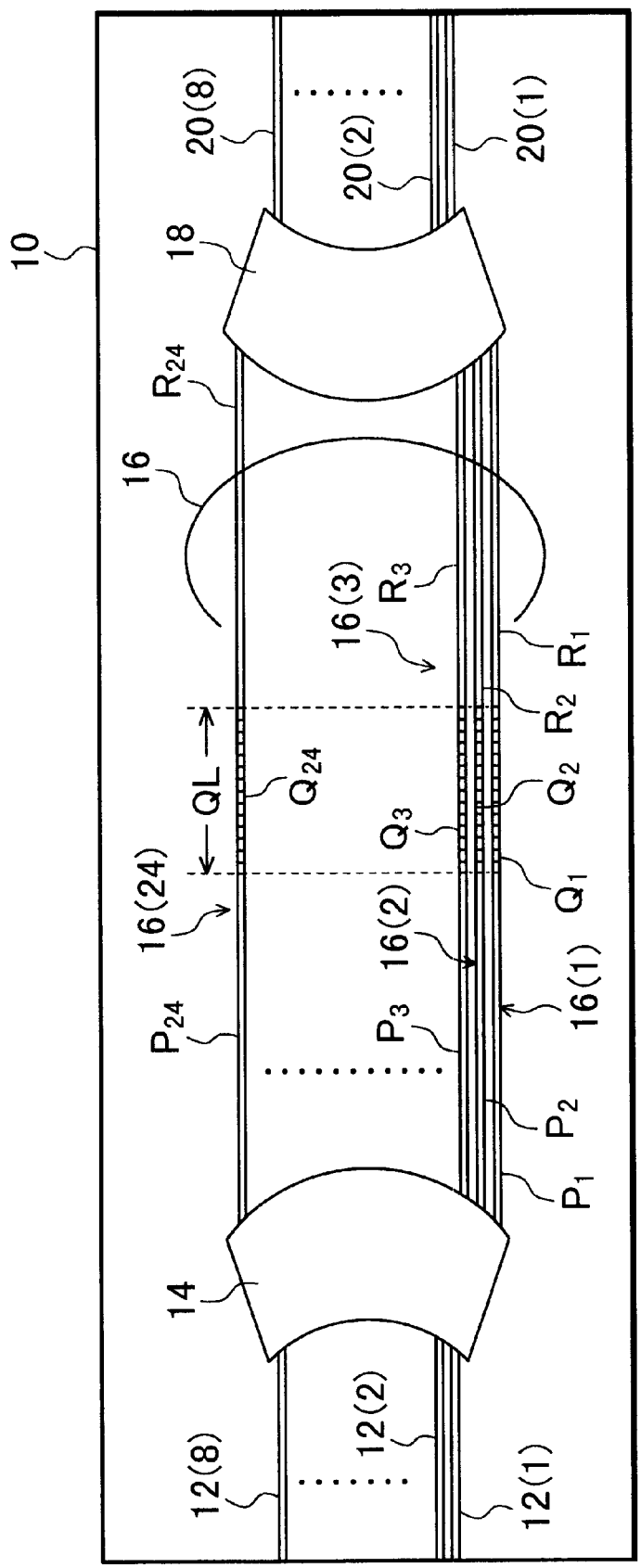
FIG. 16 is a top view of an optical multiplexer/demultiplexer according to another embodiment of the invention.

FIG. 16 is a plan view showing the structure of an AWG type optical multiplexer/demultiplexer according to the second embodiment of the invention. In FIG. 16, like elements to those shown in FIG. 2 are represented by identical reference symbols, and the description thereof is omitted.

In the first embodiment, a constant refraction index is used for the high refraction index core region of each waveguide, and the length of each high refraction index core region of each waveguide is changed, to thereby reduce the optical path length difference or make it zero.

In the optical multiplexer/demultiplexer shown in FIG. 16, the high refraction index core regions $Q_1$ to $Q_{24}$ of the arrayed waveguides 16(1) to 16(24) are set to have the same length QL and the refraction indices of the high refraction index core regions $Q_n$ to $Q_{24}$ are changed, to thereby reduce the optical path length difference or make it zero and to make each arrayed waveguide straight.

In order to make each of the high refraction index core regions $Q_1$ to $Q_{24}$ have a different refraction index, for example, the concentration of doped impurities such as fluorine and boron is changed. Generally, as the doped impurity concentration becomes high, the refraction index becomes high.

Obviously, in this embodiment, the length of each of the high refraction index core regions $Q_1$ to $Q_{24}$ may be changed or the shape of the arrayed waveguides 16(1) to 16(24) may be curved slightly.

Next, an AWG type optical multiplexer/demultiplexer according to a third embodiment of the invention will be described with reference to FIG. 17.

Figure 17:
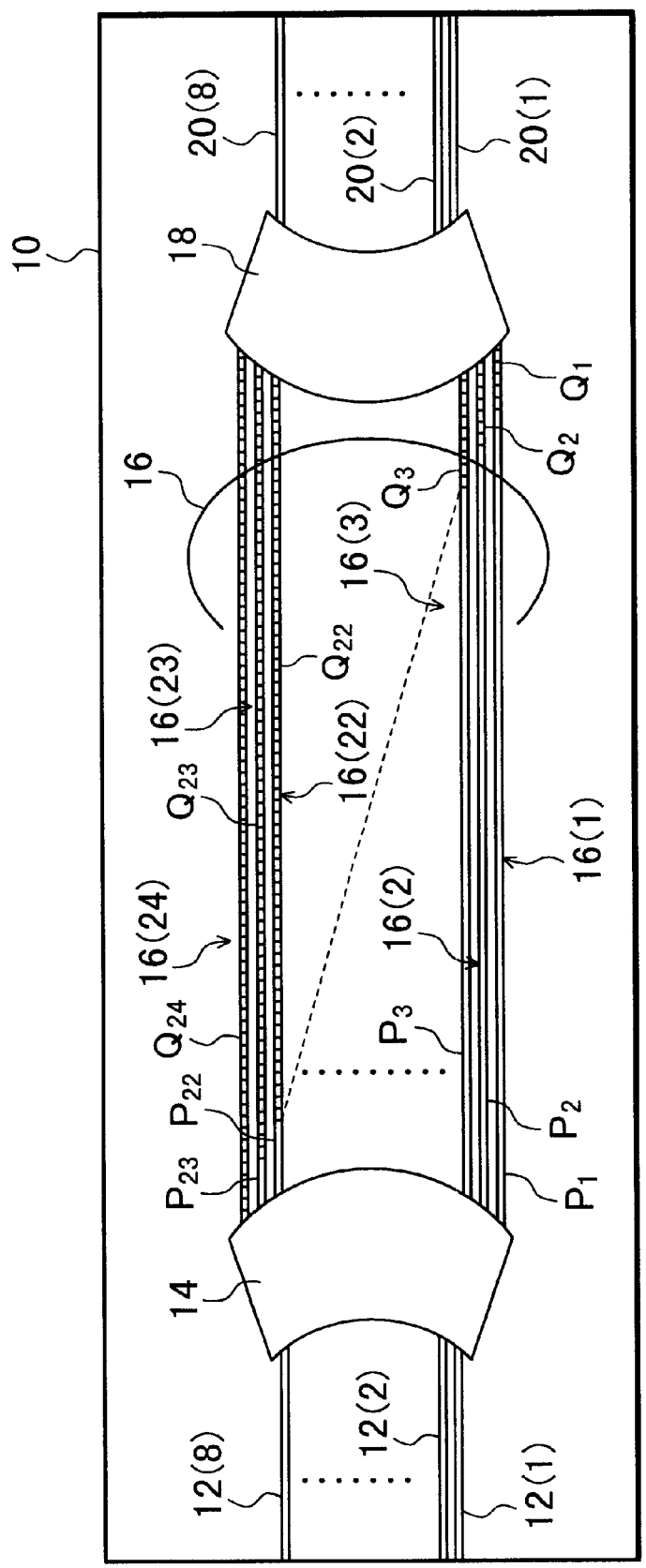
FIG. 17 is a top view of an optical multiplexer/demultiplexer according to another embodiment of the invention.

FIG. 17 is a plan view of the AWG type optical multiplexer/demultiplexer of this embodiment. In FIG. 17, like elements to those shown in FIG. 2 are represented by identical reference symbols, and the description thereof is omitted.

In the optical multiplexer/demultiplexer shown in FIG. 17, the core regions of the arrayed waveguides 16(1), 16(2), 16(3), . . . , 16(22), and 16(23) are made of a serial connection of a low refraction index core region $P_1$ and a high refraction index core region $Q_1$, a serial connection of a low refraction index core region $P_2$ and a high refraction index core region $Q_2$, a serial connection of a low refraction index core region $P_3$ and a high refraction index core region $Q_3$, . . . , a serial connection of a low refraction index core region $P_{22}$ and a high refraction index core region $Q_{22}$, and a serial connection of a low refraction index core region $P_{23}$ and a high refraction index core region $Q_{23}$. The core region of the arrayed waveguide 16(24) is made of only a high refraction index core region $P_{24}$. Some arrayed waveguides have the core regions each made of a low refraction index region and a high refraction index region, and other arrayed waveguides have the core regions each made of only a low refraction index region or a high refraction index region.

A waveguide made of only a high refraction index core region and a waveguide made of only a low refraction index core region may be used mixedly. As shown in FIG. 17, the length of each high refraction index core region of the arrayed waveguides 16(1) to 16(24) is selected so that the optical path length difference becomes zero, similar to the first embodiment shown in FIG. 2. In this structure shown in FIG. 17, the refraction index of each high refraction index core region $Q_1$ to $Q_{24}$ may be made equal or different.

The present invention has been described in connection with the preferred embodiments. The invention is not limited only to the above embodiments. It is apparent that various modifications, improvements, combinations, and the like can be made by those skilled in the art.

What we claim are:

1. An optical multiplexer/demultiplexer, comprising:
 a substrate having a principal surface on which the optical multiplexer/demultiplexer is formed;
 a first waveguide unit having a plurality of first waveguides;
 a first slab waveguide connected to said first waveguide unit;
 an arrayed waveguide grating having one end connected to said first slab waveguide, said arrayed waveguide grating including a plurality of arrayed waveguides each having a core section, the core section being a serial connection of a plurality of core regions having a different refraction index, and ratios of lengths of the plurality of core regions having a different refraction index being adjusted so that an optical path length of each of the plurality of arrayed waveguides becomes approximately equal;
 a second slab waveguide connected to another end of said arrayed waveguide grating; and
 a second waveguide unit connected to said second slab waveguide and having a plurality of second waveguides.

2. An optical multiplexer/demultiplexer according to claim 1, wherein said first waveguide unit, said first slab waveguide, said arrayed waveguide grating, said second slat waveguide and said second waveguide unit are connected in series.

3. An optical multiplexer/demultiplexer according to claim 1, wherein the arrayed waveguide is straight.

4. An optical multiplexer/demultiplexer according to claim 1, wherein said arrayed waveguide grating includes at least one arrayed waveguide made of only core regions having the same refraction index.

5. An optical multiplexer/demultiplexer according to claim 1, wherein:
 said first waveguide unit is an input waveguide unit for receiving wavelength multiplexed light and outputting the wavelength multiplexed light to said first slab waveguide; and
 said second waveguide unit is an output waveguide unit for receiving the wavelength multiplexed light from said second slab waveguide, demultiplexing the multiplexed light, and outputting the wavelength demultiplexed light from each of the second waveguides.

6. An optical multiplexer/demultiplexer according to claim 1, wherein:
 said second waveguide unit is an input waveguide unit for receiving light having different wavelengths from the second waveguides and outputting the light having different wavelengths to said second slab waveguide; and
 said first waveguide unit is an output waveguide unit for receiving the light having different wavelengths, multiplexing the light having difference wavelengths and outputting the wavelength multiplexed light from the first waveguides.

7. An optical multiplexer/demultiplexer, comprising:
 a substrate having a principal surface on which the optical multiplexer/demultiplexer is formed;
 a first waveguide unit having a plurality of first waveguides;
 a first slab waveguide connected to said first waveguide unit;
 an arrayed waveguide grating having one end connected to said first slab waveguide, said arrayed waveguide grating including a plurality of arrayed waveguides each having a core section, the core section being a serial connection of a Plurality of core regions having a different refraction index, and ratios of refraction indices of the plurality of core regions having a different refraction index being adjusted so that an optical path length of each of the plurality of arrayed waveguides becomes approximately equal;
 a second slab waveguide connected to another end of said arrayed waveguide grating; and
 a second waveguide unit connected to said second slab waveguide and having a plurality of second waveguides.

8. An optical multiplexer/demultiplexer according to claim 7, wherein said first waveguide unit, said first slab waveguide, said arrayed waveguide grating, said second slat waveguide and said second waveguide unit are connected in series.

9. An optical multiplexer/demultiplexer according to claim 7, wherein the arrayed waveguide is straight.

10. An optical multiplexer/demultiplexer according to claim 7, wherein said arrayed waveguide grating includes at least one arrayed waveguide made of only core regions having the same refraction index.

11. An optical multiplexer/demultiplexer according to claim 7, wherein the core section includes a first core region having an approximately equal refraction index at each arrayed waveguide and a second core region having a different refraction index at each arrayed waveguide.

12. An optical multiplexer/demultiplexer according to claim 7, wherein:

said first waveguide unit is an input waveguide unit for receiving wavelength multiplexed light and outputting the wavelength multiplexed light to said first slab waveguide; and said second waveguide unit is an output waveguide unit for receiving the wavelength multiplexed light from said second slab waveguide, demultiplexing the multiplexed light, and outputting the wavelength demultiplexed light from each of the second waveguides.

13. An optical multiplexer/demultiplexer according to claim 7, wherein:

said second waveguide unit is an input waveguide unit for receiving light having different wavelengths from the second waveguides and outputting the light having different wavelengths to said second slab waveguide; and said first waveguide unit is an output waveguide unit for receiving the light having different wavelengths, multiplexing the light having difference wavelengths and outputting the wavelength multiplexed light from the first waveguides.

14. A method of manufacturing an optical multiplexer/demultiplexer having a first waveguide unit, a first slab waveguide, an arrayed waveguide grating, a second slab waveguide, and a second waveguide unit, respectively connected in series, the method comprising:

(a) a step of preparing a substrate;

(b) a step of depositing a first clad layer on a principal surface of the substrate;

(c) a step of forming a first core material layer on the first clad layer, the first core material layer having a first refraction index;

(d) a step of changing a partial region of the first core material layer to a second core material layer having a second refraction index different from the first refraction index; and (e) a step of forming an arrayed waveguide grating including a plurality of arrayed waveguides by forming a plurality of core regions including a serial connection of the first and second core material layers in predetermined areas including areas where the first and second core material layers are formed in contact with each other and depositing a second clad layer on the first clad layer, ratios of lengths of the first and second core material layers being adjusted so that an optical path length of each of the plurality of arrayed waveguides becomes approximately equal.

15. A method according to claim 14, wherein said step (d) includes a step of forming the second core material layer in the partial region after the first core material layer in the partial region is removed.

16. A method according to claim 14, wherein said step (d) includes a step of doping impurities in the first core material layer in the partial region and changing the first core material in the partial region to the second core material layer having the second refraction index.

17. A method according to claim 14, wherein the predetermined areas are straight areas.

18. A method according to claim 14, wherein the predetermined areas are straight areas each having approximately the same length.

* * * * *